United States Patent
Gerard

(10) Patent No.: US 11,200,233 B2
(45) Date of Patent: *Dec. 14, 2021

(54) EVALUATION OF QUERY FOR DATA ITEM HAVING MULTIPLE REPRESENTATIONS IN GRAPH BY EVALUATING SUB-QUERIES

(71) Applicant: International Business Machines Corporation, Armonk, NY (US)

(72) Inventor: Scott N. Gerard, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 565 days.

This patent is subject to a terminal disclaimer.

(21) Appl. No.: 15/278,639

(22) Filed: Sep. 28, 2016

(65) Prior Publication Data
US 2018/0089264 A1 Mar. 29, 2018

(51) Int. Cl.
G06F 15/16 (2006.01)
G06F 16/2453 (2019.01)
G06F 16/901 (2019.01)

(52) U.S. Cl.
CPC .... *G06F 16/24535* (2019.01); *G06F 16/9024* (2019.01)

(58) Field of Classification Search
CPC ......... G06F 17/30451; G06F 17/30958; G06F 17/30477; G06N 5/02
See application file for complete search history.

(56) References Cited

U.S. PATENT DOCUMENTS

| | | | |
|---|---|---|---|
| 6,151,595 A | 11/2000 | Pirolli et al. | |
| 7,873,627 B2* | 1/2011 | Grabs | G06F 16/24542 707/713 |
| 8,706,653 B2 | 4/2014 | Kasneci et al. | |
| 8,898,159 B2 | 11/2014 | Brown et al. | |
| 9,251,208 B2* | 2/2016 | Deng | G06F 16/285 |
| 2003/0167258 A1 | 9/2003 | Koo | |
| 2008/0281801 A1* | 11/2008 | Larson | G06F 16/748 |
| 2011/0131199 A1* | 6/2011 | Simon | G06F 16/24542 707/714 |
| 2011/0258179 A1* | 10/2011 | Weissman | G06F 16/24544 707/714 |
| 2012/0005219 A1* | 1/2012 | Apacible | G06F 16/334 707/768 |
| 2012/0054226 A1 | 3/2012 | Cao | |
| 2012/0066205 A1* | 3/2012 | Chappell | G06F 17/30451 707/713 |

(Continued)

OTHER PUBLICATIONS

Oracle Spatial and Graph: RDF Semantic Graph Feature presentation, 2013, 250 pp.

(Continued)

*Primary Examiner* — Alex Gofman
(74) *Attorney, Agent, or Firm* — Anthony M. Pallone

(57) ABSTRACT

A query is for retrieving a data item of a data graph. The data graph stores representations of the data item. Each representation stores information represented by the data item in a different manner or way. Sub-queries for the query each correspond to a different representation in which the data graph stores the data item. The sub-queries are evaluated to determine an appropriate representation of the data item in satisfaction or fulfillment of the query.

20 Claims, 7 Drawing Sheets

(56) References Cited

U.S. PATENT DOCUMENTS

| | | | |
|---|---|---|---|
| 2012/0072456 A1* | 3/2012 | Dube | G06F 9/5033 |
| | | | 707/780 |
| 2013/0246462 A1* | 9/2013 | Bhogal | G06F 16/24539 |
| | | | 707/774 |
| 2013/0257871 A1 | 10/2013 | Goldstein et al. | |
| 2014/0153366 A1 | 6/2014 | Nealon et al. | |
| 2014/0351281 A1* | 11/2014 | Tunstall-Pedoe | G06N 5/02 |
| | | | 707/760 |
| 2015/0058412 A1 | 2/2015 | Hillerbrand | |
| 2015/0331850 A1* | 11/2015 | Ramish | G06F 17/2785 |
| | | | 704/9 |
| 2016/0147834 A1 | 5/2016 | Lee et al. | |
| 2017/0068748 A1 | 3/2017 | Hu et al. | |
| 2017/0177303 A1 | 6/2017 | Ma et al. | |
| 2017/0177664 A1 | 6/2017 | Ma et al. | |
| 2017/0177666 A1 | 6/2017 | Ma et al. | |
| 2018/0089263 A1 | 3/2018 | Gerard | |
| 2018/0089265 A1 | 3/2018 | Gerard | |

OTHER PUBLICATIONS

"Reconciliation", online <https://web.archive.org/web/20141030044042/http://wiki.freebase>, Oct. 16, 2012, 3 pp.
List of IBM Patents or Patent Applications to Treat as Related.
IBM: List of IBM Patents or Patent Applications Treated as Related (Appendix P), Sep. 25, 2019, 2 pages.
Pending U.S. Appl. No. 16/568,341, filed Sep. 12, 2019, entitled: "Reusing Sub-Query Evaluation Results in Evaluating Query for Data Item Having Multiple Representations in Graph", 55 pages.

* cited by examiner

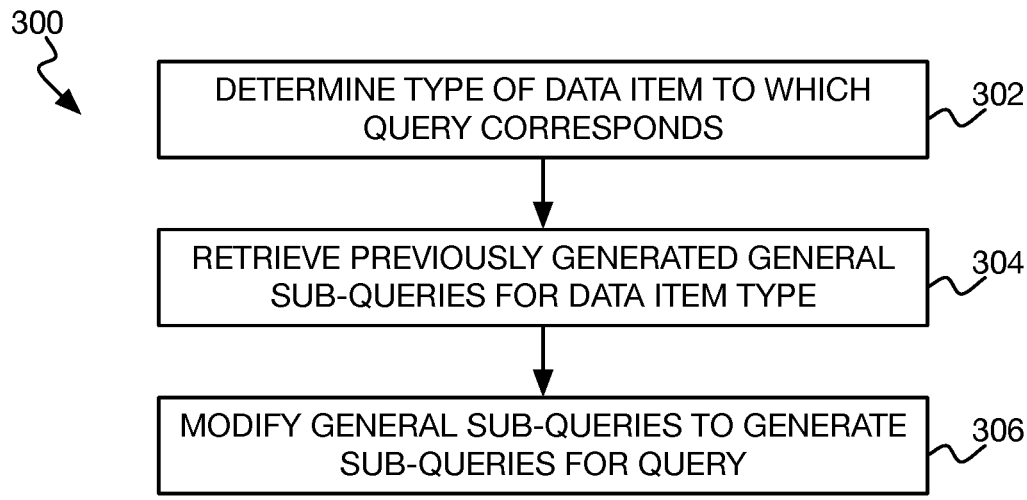
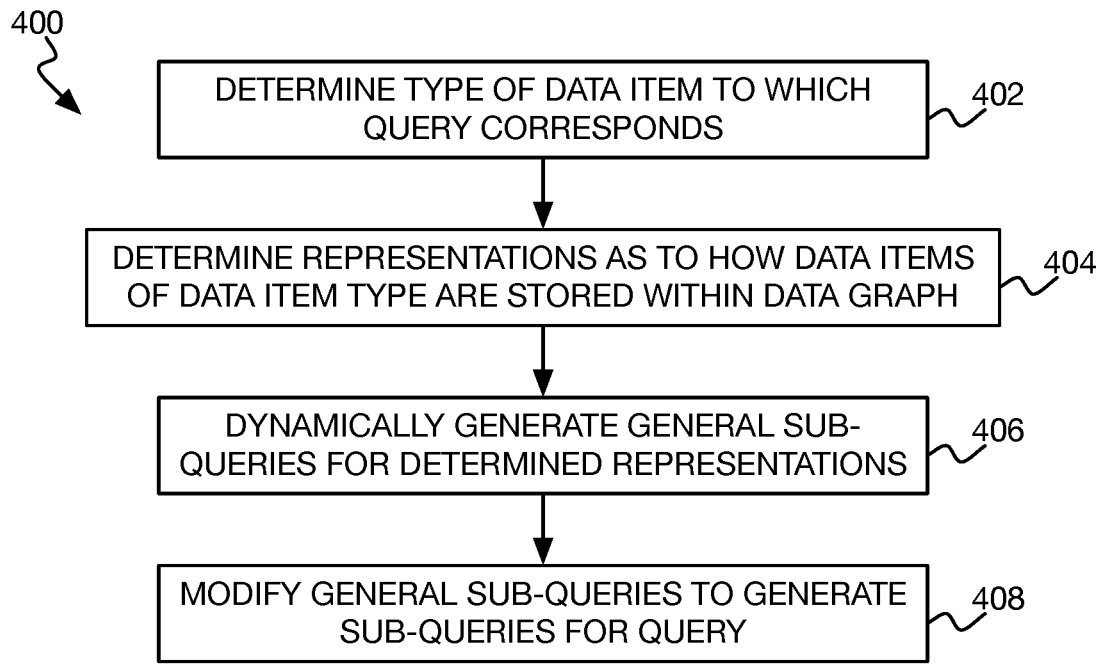

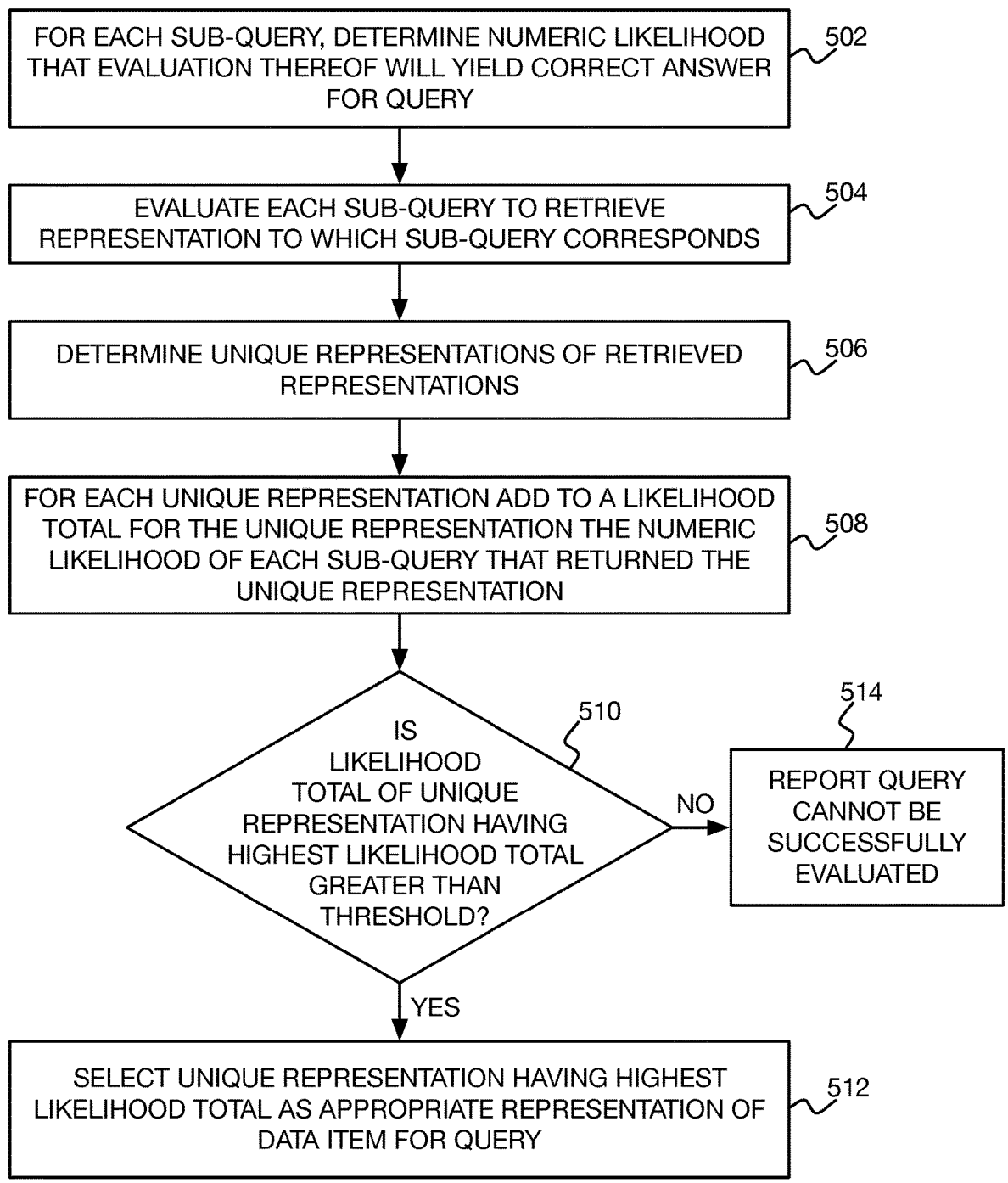

EVALUATION OF QUERY FOR DATA ITEM HAVING MULTIPLE REPRESENTATIONS IN GRAPH BY EVALUATING SUB-QUERIES

BACKGROUND

Data is commonly stored in computing systems for later retrieval. Such retrieval can be performed by querying a data store for a desired data item that may be stored in the data store. Data may be stored within a computing system as a data graph. A data graph includes a number of nodes, which are connected to one another via edges. Data can be stored within each node, as well as on each edge.

SUMMARY

An example method includes receiving, by a computing device, a query for retrieving a data item of a data graph. The data graph stores representations of the data item. Each representation of the data item stores knowledge represented by the data item in a different manner. The method includes determining, by the computing device, sub-queries for the query. Each sub-query corresponds to a different representation by which the data graph stores the data item. The method includes evaluating, by the computing device, one or more of the sub-queries to determine an appropriate representation of the data item in satisfaction of the query.

An example computer program product includes a computer-readable storage medium having program instructions embodied therewith. The computer-readable storage medium is not a transitory signal per se. The program instructions are executed by a computing device to determine sub-queries for a query. The query is for retrieving a data item of a data graph. The data graph stores representations of the data item. Each representation of the data item stores knowledge represented by the data item in a different way. Each sub-query corresponds to a different representation by which the data graph stores the data item. The program instructions are executed by the computing device to evaluate one or more of the sub-queries to determine an appropriate representation of the data item in fulfillment of the query.

An example system includes network hardware to communicatively connect to a network over which a query for retrieving a data item of a data graph is received. The system includes a storage device to store the data graph. The data graph includes representations of the data item. Each representation represents the data item in a different way. The example system includes logic having hardware. The logic is to select an appropriate representation of the data item in satisfaction of the query by evaluating sub-queries for the query. Each sub-query corresponds to a different representation by which the data graph stores the data item.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 3 and 4 are flowcharts of different example methods for determining sub-queries for a query, which can be used as part of the method of FIG. 2.

FIGS. 5, 6, and 7 are flowcharts of different example methods for evaluating all the sub-queries of a query, which can be used as part of the method of FIG. 2.

DETAILED DESCRIPTION

Figure 1:
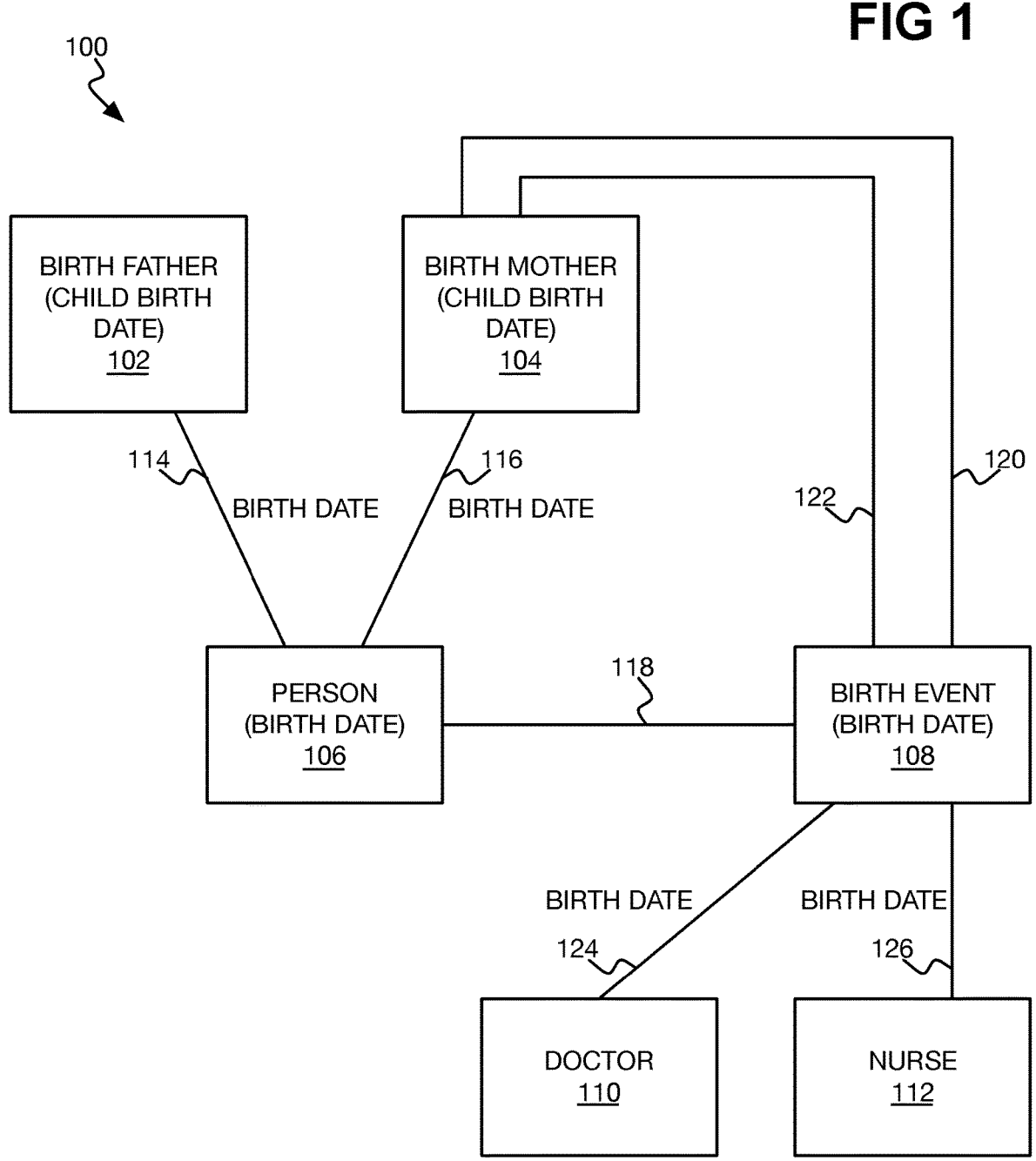
FIG. 1 is a diagram of an example data graph.

As noted in the background section, a computing system can store retrievable data as a data graph including nodes that are interconnected to one another by edges. Traditionally, data has been stored canonically. This means that for any piece of information, there is a single, unambiguous manner by which the information is canonically represented within a data graph. Before new data is added to the data graph, the data is "cleaned" to ensure that any ambiguity in the information or knowledge to which the data corresponds is removed.

However, more recently data has begun to be stored cognitively to better reflect the ambiguous nature of information. This means that for a piece of information, there can be multiple ways in which the information can be represented within a data graph. Each representation of the data may convey the information in a different way, and no particular way may be considered the "right" or "correct" way in an absolute sense. Data can be added to the data graph without having to remove any ambiguity in the information or knowledge to which the data corresponds.

As one example, a person's date of birth is not necessarily devoid of ambiguity. A woman may enter a hospital to give birth on December 30, begin labor on December 31, and give birth on January 1 to a child. While January 1 may be commonly considered the date of birth of the child, in other circumstances December 30 or December 31 may be considered the birth date. The hospital may track birth dates by when expectant mothers enter the hospital, in which case December 30 is the birth date. Certain inheritance and tax methodologies may permit December 31 to be listed as the birth date. Therefore, there is ambiguity within the birth date. Neither December 30, December 31, nor January 1 is the "wrong" birth date in an absolute sense. Rather, each of these dates is the "right" birth date depending on the context in question.

Storing multiple representations of a data item is thus useful in a cognitive sense, because different representations of the data item may be appropriate for different contexts, and therefore for satisfying different queries for the same data item. A query requesting a person's birth date for tax or inheritance purposes may solicit a different representation of the same data item as compared to a query requesting the same person's birth for more conventional purposes. Reflecting the ambiguous nature of information by storing multiple representations of a data item permits fulfillment of cognitively diverse queries for the same data item but that may be soliciting different representations of the item.

Disclosed herein are techniques for evaluating a query for a data item that has multiple representations in a data graph. Multiple sub-queries for the query are determined, where each sub-query corresponds to a different representation by which the data graph stores the data. Each representation of the data item within the data graph corresponds to a different way or manner by which the knowledge or information represented by the data item is stored. One or more of the sub-queries for the query, such as in some cases all the sub-queries, are evaluated to determine or yield an appropriate representation of the data item for the query in question, to satisfy or fulfill the query.

Such techniques can provide for the retrieval of the most accurate representation of a data item in fulfillment of the query. Because multiple sub-queries can be evaluated, including all the sub-queries in some cases, the sub-queries and/or the representations that their evaluations return can be analyzed in a variety of different ways to select the representation that is most likely the appropriate representation of the data item for the query. Different such ways are presented herein to analyze the representations returned by the sub-queries to ensure that in all likelihood the appropriate representation for the query is selected and returned.

FIG. 1 shows an example data graph 100 that cognitively stores information over nodes 102, 104, 106, 108, 110, and 112 that are interconnected to one another by edges 114, 116, 118, 120, 122, 124, and 126. The data graph 100 cognitively stores information in that the graph 100 stores multiple representations of a data item, such as the birth date of the person identified by the node 106, which each store a different cognition of this knowledge that the data item represents in a different way or manner. In the example of FIG. 1, the edges 114, 116, 118, 120, 124, and 126 are non-directional, but in another implementation, one or more edges interconnecting nodes like the nodes 102, 104, 106, 108, 110, and 112 can be directional. A directional edge connects a source or "from" node to a destination or "to" node, and the direction of the edge can itself indicate information.

The nodes 102 and 104 correspond to the birth father and the birth mother, respectively, of the person of the node 106. Each of the nodes 102 and 104 may store the birth date of the person of the node 106. The node 102 may store Dec. 31, 1964 as the date of the person of the node 106, whereas the node 104 may store Jan. 1, 1965. Dec. 31, 1964, may be the date of the person for tax purposes, whereas Jan. 1, 1965 may be the medical date of birth of the person. The node 106 may store Jan. 1, 1965, which is the date that the person of the node 106 identifies as his or her birth date.

The edges 114 and 116 connect the node 102 and 104, respectively, to the node 106. Each of the edges 114 and 116 may also store the birth date of the person of the node 106. The edge 114 may store Dec. 31, 1964 as the date of the person of the node 106, for inheritance purposes. The edge 116 may store Jan. 2, 1965 as the date of the person of the node 106, as the date when the birth mother left the hospital after giving birth.

The node 108 is an event node that corresponds to the birth event of the person of the node 106. The node 108 is therefore connected to the node 106 by an edge 118. The nodes 102 and 104 of the birth father and the birth mother are likewise connected to the node 108 by edges 120 and 122, respectively. The edges 118, 120, and 122 may not contain any information regarding the birth date of the person of the node 106. The node 108 may store Jan. 1, 1965, which is the date of the actual birth of the person of the node 106 as recorded at the hospital.

The node 110 corresponds to the doctor that performed delivery of the person of the node 106 at the hospital, and the node 112 corresponds to the attending nurse that assist the delivery of the person of the node 106 at the hospital. The nodes 110 and 112 are thus connected to the node 108 by edges 124 and 126, respectively. The edge 124 may store Dec. 31, 1964 as the date of the person of the node 106, as the date when the doctor was first called to the delivery room to perform the delivery. The edge 126 may store Dec. 30, 1964 as the date of the person of the node 106, as the date when the nurse was first called to the delivery room to assist the delivery upon admission of the of the birth mother to the hospital.

Therefore, within the data graph 100, the birth date of the person of the node 106 is differently listed as Dec. 30, 1964, Dec. 31, 1964, Jan. 1, 1965, and Jan. 2, 1965. None of these dates may be cognitively incorrect or wrong, but rather each date may represent a different cognitive understanding of what birth date is, for different purposes, including legal, tax, cultural, medical, and administrative purposes. Each node and each edge that stores the birth date of the person of the node 106 may provide contextual or cognitive information as to why or how it considers the birth date of the person of the node 106 to be the date that has stored, such as for legal, tax, cultural, medical, or administrative purposes. However, this is not necessarily the case.

The data graph 100 may have been constructed by adding information from different data stores. For example, records from a tax database may be imported, as well as records from a hospital database, an ancestral research database, a credit reporting database, and so on. When adding data to the data graph 100, via construction of new nodes or edges, the information or knowledge that the data represents is not "cleaned" or scanned to ensure that programmatically the same information is represented in the same canonical manner. That is, what one data source considers an individual's birth date as compared to what a different data source considers as an individual's birth date is not considered when adding information to the graph 100. Rather, the data may simply be added, resulting in the situation described above, in which the birth date of the person of the node 106 is not identical across different nodes and edges of the graph 100.

The data graph 100 may be a union of one or more other graphs, which may themselves be programmatic or cognitive. The union of two graphs that each store data canonically in a single canonical manner may result in a constructed graph that stores data cognitively in diverse manners if the canonical manner of one source graph is different than that of the other source graph. For example, a data graph storing birth date as the date of birth as conventionally or by custom understood in Western countries that is joined to a data graph that stores birth date by date of hospital admission for medical billing purposes results in a combined data graph that stores birth date in two different ways, underscoring that birth date may cognitively differ.

Furthermore, a given node or edge of the data graph 100 may store incorrect information for a particular data item. For example, an error in data entry may result in the birth date of the person of the node 106 being incorrect in one of the nodes or along one of the edges of the graph 100. When the data in question is added to the graph 100, there may not be a verification or check to ensure that the data is accurate for the way in which the data represents the birth date of the person of the node 106. The acknowledgment that the information represented by the graph 100 may not necessarily be 100% accurate, too, can underscore the cognitive nature of the knowledge of the graph 100, in that stored knowledge may not be accurate.

However, to the extent that the data graph 100 accurately stores multiple representations of the birth date of the person of the node 106 that differ from one another, no individual representation may be considered correct or right in an absolute sense. That the date of birth of the person of the node 106 may be different among different nodes and edges of the graph 100 does not mean that any specific date listed for this birth date is necessarily wrong. Rather, that the birth dates differ just signifies that for different purposes, for instance, the birth date of the person of the node 106 can vary.

The data graph 100 depicted in FIG. 1 is an example of a portion of a graph. A graph like the graph 100 of FIG. 1 that stores information concerning birth dates, among other knowledge, will usually include hundreds, thousands, or even millions of nodes and edges. Just six nodes and seven edges are depicted in FIG. 1 as an example of a data graph 100 that stores multiples representations of a data item—the birth date of the person of the node 106.

Furthermore, other data graphs can store information other than birth dates. The information can concern people, or may not concern people. Other information that may concern people include other types of medical, tax, legal, and birth information. Information that may not concern people can include information regarding events, places, or things. That is, the data graph 100 is just an example, and does not represent the sole type of data graph to which the techniques disclosed herein can be applied to retrieve data items from such a data graph that can store multiple representations of each data item as a cognitive approach to data storage.

Figure 2:
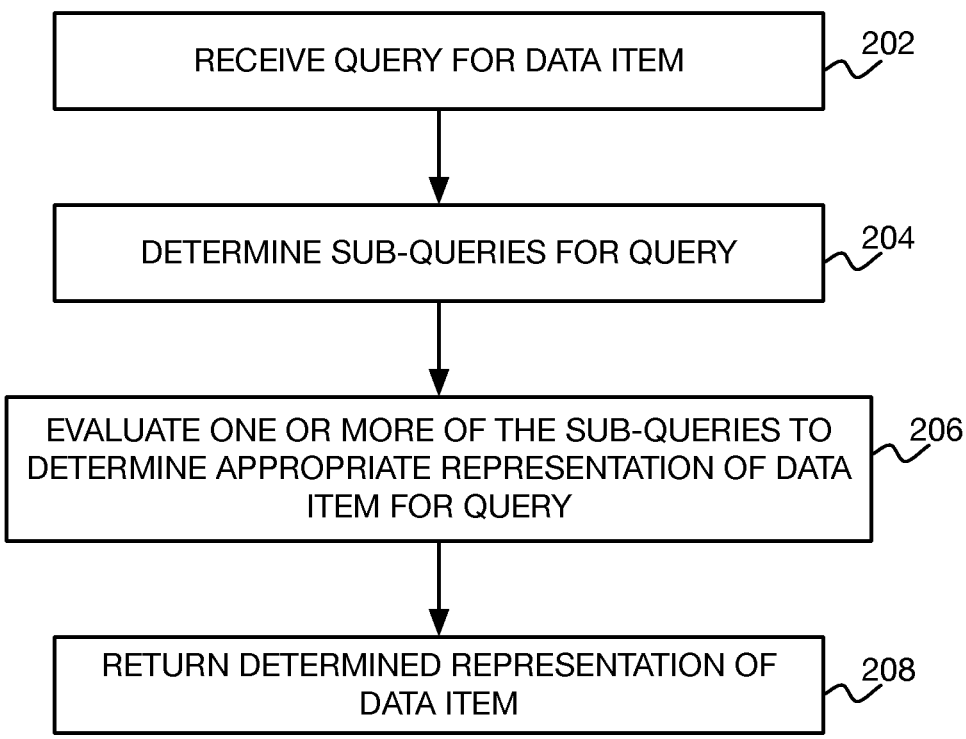
FIG. 2 is a flowchart of an example method for evaluating a query against a data graph storing multiple representations of a data item.

FIG. 2 shows an example method 200 for evaluating a query against a data graph, like the graph 100 of FIG. 1, which stores multiple representations of a data item. As noted, for a given data item having multiple representations, each representation stores knowledge or information of the data item in a different manner. That is, each representation represents the same underlying data item, but represents a different cognitive manner or way of considering the knowledge or information that the data item conveys or "is."

The method 200 is performed by a computing device that includes or that is communicatively connected to a storage device or system storing the data graph. The data graph may include terabytes, petabytes, or more of data, and as such, the storage system can be or include a multiple-storage device system such as a storage-area network (SAN). The computing device may be a server computing device, which is communicatively connected to a network to interact with the storage system, as well as with client computing devices, such as desktop or laptop computers as well as mobile computing devices like smartphones and tablet computing devices, which submit queries and to which data items responsive to the queries are returned.

The computing device thus receives a query for a data item (202). The query may be received from a client computing device. The query may be received over a network to which the computing device performing the method 200 and the client computing device are communicatively connected.

The query may be formatted in a natural language manner, such as "what is the birth date of John Smith for tax purposes"; "give me John Smith's date of birth"; "when was John Smith born"; and so on. Natural language processing therefore can be performed on the query to determine the data item of the query. In the examples, the data item in question is the birth date of John Smith, and may indicate the data item with more granularity or precision to the extent that the query includes such information, or to the extent that metadata surrounding the query can provide this information. For instance, if the query specifies, "what should I list as John Smith's birth date on his dad's will," then the natural language processing may discern that the birth date being requested is that for inheritance purposes. As another example, if the query is received from a nurse at a hospital, then the processing may discern that the birth date being requested is the date when the nurse began attending to the expectant mother upon her admission to the hospital at which the nurse was working.

The query can also be specified in a more particular manner. The different data items that a data graph stores can be known. Furthermore, the multiple representations of each data item can be known. Therefore, a query may be specified by selecting a type of data item, such as birth date, and then by selecting a particular representation of the this birth date, such as "customary," "for tax purposes," "for inheritance purposes," and so on. The query thus specifies the desired person for whom this data item is being requested, like "John Smith," as well as the particular representation of the data item that is desired. This specification of the query is more precise than a natural language specification of the query, but may be less intuitive for users, particularly less computer-savvy users.

The computing device determines sub-queries for the received query (204). Two specific implementations for determining the sub-queries for a query are described later in the detailed description. In general, each sub-query corresponds to a representation of the data item within the data graph. For instance, as to the birth date of a person within the data graph 100 of FIG. 1, such as the person of the node 106, there may be a sub-query corresponding to each of the nodes 102, 104, 106, and 108, as well as a sub-query corresponding to each of the edges 114, 116, 124, and 126, for a total of eight sub-queries. This is because each node 102, 104, 106, and 108 and each edge 114, 116, 124, and 126 stores the birth date of a person, particularly the person of the node 106.

Even though multiple node(s) or multiple edge(s) may store the same underlying understanding of the data item, each such node or edge can still have a different sub-query because it still corresponds to a different representation of the data item. For example, the birth date of the person as stored in the node 106 may reflect the same underlying understanding of what birth date means as that stored in the node 108. However, the representation of the birth date of the person as stored in the node 106 is still different than that stored in the node 108. Therefore, there can be a sub-query to retrieve the birth date of the person as stored in the node 106, and another sub-query to retrieve the birth date of the person as stored in the node 108.

The computing device evaluates one or more of the sub-queries of the query to determine an appropriate representation of the data item for the query (206). The appropriate representation of the data item for the query can be considered the representation of the data item that is correct for the query, and thus correctly answers the query insofar as the information contained in this representation is accurate. In some implementations, not all the sub-queries of the query are evaluated, whereas in other implementations, all the sub-queries of the query are evaluated. Different approaches for evaluating one or more of the sub-queries to select an appropriate representation of a data item for a query are presented later in the detailed description.

As an example of an appropriate representation of a data item in satisfaction of a query, if the query requests the birth date of the person of the node 106 of the data graph 100 of FIG. 1 as birth date is culturally commonly understood in Western societies, the representation of the data item as stored within the nodes 106 and 108 is likely the appropriate representation to return is high. By comparison, the likelihood that the representations of the birth date as stored on edges 124 and 126 is unlikely to be the appropriate representation for this query. Whether a particular representation of the data item is appropriate for the query thus is dependent on the query itself. A sub-query that retrieves the birth date of the person for tax or inheritance purposes is unlikely to be the appropriate representation of the data item for a query requesting the birth date as commonly and culturally understood. By comparison, such a sub-query is likely to be the appropriate representation of the data item for a query that is requesting the birth date for trust and estate purposes.

It is noted that some representations of a specific data item within a data graph may not be present. For instance, in the example data graph 100 of FIG. 1, the nodes 102, 104, 106, and 108 and the edges 114, 116, 124, and 126 can store the birth date of the person of the node 106. However, this information may be missing from one or more of the nodes, and/or from one or more of the edges. The information may be missing because a data source added to the data graph 100 did not include the information, or for another reason. In such cases, the most appropriate representation that is selected for the data query may not be the best representation, because the best representation is not present within the graph 100. There is no guarantee that any given representation of a data item is actually available within the graph 100, in other words.

The computing device returns the determined representation of the data item in satisfaction of the query (222). In some cases, however, no representation of the data item may be returned, as described in detail below. For instance, if there is not a representation of the data item stored in the data graph that has a great enough likelihood that it is the representation of the data item sought in the query, no representation of the data item may be returned instead of returning a representation that has a low likelihood of being the information that the query is requesting.

FIG. 3 shows an example method 300 that provides one approach for determining the sub-queries for a query. The method 300 can implement part 204 of the method 200. As such, the computing device performing the method 200 can perform the method 300.

The computing device determines the type of data item to which a query corresponds (302). A data graph stores multiple representations of data items. For example, a data item can be the birth date of the person of the node 106 of the data graph 100 of FIG. 1. The birth date of this person is the data item, and the type of this data item is birth date. The birth dates of people of other nodes of the graph 100 have the same data type. That is, a data item can be considered a particular instance of a data type. Stated another way, a birth date is a type, whereas the birth date of a particular person is a data item of this type. Furthermore, the birth date has multiple representations within a data graph.

Determining the type of the data item to which the query corresponds can be achieved from the data item of the query. As noted above in relation to part 202 of the method 200, the data item of a query is determined. If a query is a natural language query, then natural language processing occurs to identify the data item of the query. The data item type can thus be determined from the data item type. For example, if natural language processing concludes that the query is for the data item "John Smith's birth date," then the data item type is simply "birth date." That is, the data item type is determinable from the data item of a query. By comparison, a query can be constructed by selecting a data item type, such as birth date, along with identifying information of the person for whom a date item of this type is desired, such as "John Smith," then the query itself identifies the data item, as well as the data item type of the query.

The computing device retrieves general sub-queries that have been previously generated for the type of the data item to which the query corresponds (304). When a data graph is created or augmented, each time a new representation of a data item is added to the graph, a corresponding general sub-query can be manually or automatically generated for the representation if no such sub-query has previously been created for a data item of the same type. For example, as to the data graph 100, the first time a node corresponding to a birth event, like the node 108, is added, which corresponds to a new representation of a birth date data item, a corresponding general sub-query can be manually or automatically generated. As another example, the first time an edge corresponding to when a doctor was called to perform delivery, like the edge 124, is added, which also corresponds to a new representation of a birth date data item, a corresponding general sub-query can be generated.

A general sub-query can identify the type of node or edge in which a corresponding representation of a data item may be located, without specifying a particular node or edge. For example, a general sub-query can specify a node for a birth event, via node type for instance, without particularly identifying the node 108. As another example, a general sub-query can specify an edge between a node of a doctor and a birth event node, via edge type for instance, without particularly identifying the node 124.

A general sub-query may further provide traversal information as to how to reach the type of node or edge in question from an entry node within a data graph. For example, if a node corresponding to a person, such as the node 106, is an entry node within a data graph, then traversal information for a birth event node may specify that the birth event node is located on an edge directly connected to the node of the person. Traversal information for an edge specifying the birth date as the date when a doctor was called to perform delivery may specify that, from the node of a person, traversal first occurs to a birth event node of that person, and then to the edge connecting the birth event node to the node of a doctor.

For each general sub-query that has been retrieved, the computing device modifies the general sub-query to generate a corresponding sub-query for the specific query in question (306). That is, each general sub-query can be modified so that it is specific to the actual data item sought in the query. For example, the query may be for a birth date data item of the person of the node 106. The general sub-query for a birth event node does not particularly specify the person of the node 106. Therefore, modifying the general sub-query so that it pertains to the person of the node 106 may include identifying the name of the person of the query. As such, the general sub-query is now specific to the query, because it identifies the name of the person for whom a data item—specifically birth date—is being sought in the query.

The method 300 thus retrieves previously generated (general) sub-queries for a query. Generating the sub-queries ahead of time can be advantageous to ensure for optimal performance in processing queries, since sub-queries do not have to be generated after a query is received. However, for data graphs that have a large number of representations of a large number of data items, performing such preprocessing to generate sub-queries prior to query receipt may be undesirable. For instance, it may not be known if certain representations or certain data items may be the subject of queries, in which case generating sub-queries ahead of time may represent unnecessary processing.

FIG. 4 shows an example method 400 that provides another approach for determining the sub-queries for a query. Like the method 300, the method 400 can implement part 204 of the method 200. The computing device performing the method 200 can thus perform the method 400.

The computing device determines the type of data item to which a query corresponds (402), as in part 302 of the method 300. The computing device further determines the representations as to how data items of this type are stored within the data graph in question (404). The different representations by which a data graph stores the knowledge or information of a data item can be recorded when a data graph is created, or when a data graph is subsequently augmented with new data.

For instance, a data graph may first be generated just with information of data including birth father and birth mother of each of a number of people, including associated birth date information. In the example of FIG. 1, this includes the information of the nodes 102, 104, and 106, and the information of the edges 114 and 116. As to the birth date of a person, such as that of the person of the node 106, there are four representations of this data item. Therefore, when the node 106 is instantiated, the representation of the birth date of the person of the node 106 is recorded, and likewise when the nodes 102 and 104, and the edges 114 and 116, are instantiated.

Continuing the example, the data graph 100 of FIG. 1 may subsequently be augmented with a data source from a hospital, which includes the information of the nodes 108, 110, and 112, and the information of the edges 124, 126, and 128. As to the birth date of a person, such as again that of the person of the node 106, there are three additional representations of this data item. Therefore, when the nodes 108, 110, and 112 are instantiated, the representations of the birth date of the person of the node 106, and likewise when the edges 124 and 126 are instantiated.

The computing device then dynamically generates the general sub-queries for the determined representations of the data item of the query (406). This process is similar to that described in relation to part 304 of the method 300, but occurs after a query has been received, as opposed to when a data graph is created or augmented. The computing device finally modifies the general sub-queries to generate the specific sub-queries for the query that has been received (408), as described above in relation to part 306 of the method 300.

The method 400 may be performed in lieu of the method 300 if performance of adding data to a data graph is prioritized over performance of query evaluation, since the method 400 generates the general sub-queries at the backend (after a query is received) instead of at the frontend (when a graph is created or augmented). The method 400 may be performed in lieu of the method 300 if there are data item representations that are unlikely to be the subject of queries, in which case generating the sub-queries at the time of graph creation or augmentation may represent unnecessary processing. Furthermore, the methods 300 and 400 can be performed in the context of the same data graph, in which some data items have representations for which general sub-queries have been created, and other data items do not.

FIG. 5 shows an example method 500 that provides approach for evaluating the sub-queries of a query to determine the appropriate representation of the data item for the query (500). The method 500 can implement part 206 of the method 200. As such, the computing device performing the method 200 can perform the method 500.

For each sub-query, the computing device determines the numeric likelihood that evaluation of the sub-query will yield the correct answer for the query (502). Different implementations can determine these numeric likelihoods in different ways. Two example implementations are now described.

As has been noted, each sub-query corresponds to a different representation of the data item stored in the data graph. In general, a sub-query can be considered as having likelihoods for the different representations of the data item to which the sub-query corresponds. A sub-query elicits a particular representation of a data item. However, the particular representation to which the sub-query corresponds may be more likely to also be the same as other representations of the data item, but less likely to be the same as still other representations of the data item. Therefore, the sub-query for eliciting a particular representation can be considered as having likelihoods for all the representations of the data item. The highest likelihood of the sub-query is for the representation that the sub-query specifically elicits. The lowest likelihood is for the representation that the sub-query is least likely to elicit.

An example is informative in this respect. Consider the birth date of a person of the node 106 of the data graph of FIG. 1, specifically the representation as to what the person him or herself considered as his or her birth date. This is the representation of the birth date stored in the node 106. There is a sub-query that elicits this representation, and which has the highest likelihood for this representation, such as 100%. For the remainder of this example, this sub-query is referred to as the given sub-query.

Another representation of the date of birth of the person is stored in the node 108, and corresponds to the date of the actual birth of the person at the hospital. The likelihood that this date is also the date that the person him or herself considers as his or her birth date is very high. Therefore, for this representation, the given sub-query (i.e., the sub-query corresponding to the representation of the birth date as stored within the node 106 itself) may have a very high likelihood, such as 90%.

Two other representations of the date of birth of the person are stored in the nodes 102 and 104. The former representation is the date of the person for tax purposes, whereas the latter representation is the medical date of birth of the person. The likelihood that the former date is the date that the person him or herself considers as his or her birth date is low, whereas the likelihood that the latter date is the date that the person him or herself considered as his or her birth date is very high. Therefore, for the former representation, the given sub-query may have a low likelihood, such as 10%, but for the latter representation, the given sub-query may again have a likelihood of 90%.

The edges 114 and 116 also store representations of the date of the person, with the former edge storing the date for inheritance purposes, and the latter edge storing the date when the birth more left the hospital after giving birth. The likelihood that the former date is the date that the person him or herself considers as his or her birthdate is low, and the likelihood that the latter date is the date that the person him or herself considered as his or her birth is very low. Therefore, for the former representation, the given sub-query may have a likelihood of 10%, and for the latter representation, the likelihood of the given sub-query is even lower, such as 5%.

Finally, the edges 124 and 126 store representations of the date of the person, too. The former edge stores the date when the doctor was first called to the delivery room, and the latter edge stores the date when the nurse was first called to the delivery room. The likelihood that these dates are the same as the date that the person him or herself considers as his or her birth date may be neither high nor low in the former instance, and low in the latter instance. Therefore, for the former representation, the given sub-query may have a likelihood of 50%, and for the latter representation, the given sub-query may have a likelihood of 10%.

Thus, each sub-query has likelihoods for all the representations of a data item, where the highest likelihood of 100% can be reserved for the representation to which the sub-query actually corresponds. The likelihoods can be manually assigned by a data architect when a data graph is created, or as new data is added to the data graph (with new representations and/or new data item types created). The likelihoods can be determined in other ways as well. For example, statistical analysis can be performed among the various representations of the data items of the same type to determine the likelihood that each pair of two representations is the same. Other types of analyses can include conducting surveys of users, and so on.

Therefore, each sub-query has a numeric likelihood that it will return each representation of a data item. For example, if there are representations A, B, C, D of a data item, then there are corresponding sub-queries a, b, c, d for these data items. Sub-query a has numeric likelihoods raA, raB, raC, raD for the representations A, B, C, D; sub-query b has numeric likelihoods rbA, rbB, rbC, rbD for the representations A, B, C, D; sub-query c has numeric likelihoods rcA, rcB, rcC, rcD for the representations A, B, C, D; and sub-query d has numeric likelihoods rdA, rdB, rdC, rdD for the representations A, B, C, D.

In one implementation, a selected sub-query may be chosen that best corresponds to the query in question. That is, the computing device determines a selected sub-query that evaluation of which will most likely yield the appropriate representation of the data item for the query. For example, if the query is for the date of birth of a person for tax purposes, then the sub-query corresponding to the representation stored in the node 102 of the data graph 100 of FIG. 1 is definitively selected. As another example, if the query is for when a person was actually born, then the sub-query corresponding to the representation stored in the node 104—which is the actual medical date of birth—may be selected. However, in this case, the representation stored in the node 108, which is the date of the birth as recorded at the hospital, may be equally valid.

When there are multiple representations that may best correspond to a query, one of the representations may be randomly chosen in this implementation to determine the selected sub-query, or other data may be employed to make a decision. For instance, the data source from which the data of the node 104 was imported may have been determined as being less accurate than that from which the data of the node 108 was imported. As such, the sub-query for the representation of the node 108 may be selected over that for the representation of the node 104 if both are otherwise equally appropriate for the query.

In general, determining a selected sub-query in this implementation thus involves matching the information requested by the query with the different representations of the data item. For very particular queries that align with the different representations, such matching will definitively result in the determination of a selected sub-query. A query asking for the birth date of a person for tax purposes, inheritance purposes, and so on, definitively matches sub-queries when there are representations of birth date for tax purposes and inheritance purposes. If a one-to-one matching is not possible, due to, for example, the imprecision of the query, however, statistical modeling and other techniques may be employed to determine the selected sub-query. As one example, if a one-to-one matching is not possible and if the query just asks for the data item without qualifiers (i.e., asking for the date of birth of a person without specifying any further for what purpose), then a preassigned sub-query may be selected.

In this implementation, then, the numeric likelihood that evaluation of a sub-query will yield the correct answer for the query is equal to the numeric likelihood that evaluation of the sub-query will yield the representation of the selected sub-query for the query. In the example in which there are sub-queries a, b, c, d that correspond to representations A, B, C, D of a data item, for instance, sub-query B may be selected as corresponding to the query. Therefore, the numeric likelihoods that evaluation of the sub-queries a, b, c, d will yield the appropriate representation of the data item for the query are the numeric likelihoods raB, rbB, rcB, rdB, respectively. This is because these are the likelihoods of the sub-queries for retrieving the representation B of the data item to which the selected sub-query B for the query corresponds.

However, the specific representation of the data item sought in a query may not be clearly identifiable, such that one selected sub-query may not be able to be chosen for the query. This is particularly the case in which freeform queries are entered in a natural language manner, making it potentially more difficult to confidently select a sub-query for the query. Therefore, in another implementation, the numeric likelihoods of the sub-queries can further be weighted by whether the representations are likely the information that the query is seeking.

Most generally, machine learning or another technique can be employed to analyze a natural language, freeform query against the available representations of a data item to weight each representation by the likelihood that it is the most appropriate representation for the query. Natural language processing techniques, for instance, may be used to determine the meaning of a natural language, freeform query, and then the meaning mapped to the representations of a data item to determine the weights as to the likelihood that the representations are the answer that the query is seeking. A first representation having a higher weight than a second representation means that the first representation is more likely to be the appropriate representation of the data item for the query than the second representation. The result, then, is a weight assigned to each representation of the data item, as the likelihood that this representation is the information that the query is seeking.

In this implementation, for each unique pair of a sub-query and a representation, the weight assigned to that representation for the query is multiplied by the ranking that the sub-query has for the representation, to yield a weight-ranking product for each sub-query-representation pair. For a query, each representation A, B, C, D of the data item has a corresponding weight wA, wB, wC, wD. Therefore, for the pairs including the representation A and the sub-queries a, b, c, and d there are products wA*raA, wA*rbA, wA*rcA, and wA*rdA, respectively. For the pairs including the representation B and the sub-queries a, b, c, and d there are products wB*raB, wB*rbB, wBrcB, and wBrdB, respectively. For the pairs including the representation C and the sub-queries a, b, c, and d there are products wC*raC, wC*rbC, wC*rcC, and wC*rdC, respectively. For the pairs including the representation D and the sub-queries a, b, c, and d there are products wD*raD, wD*rbD, wD*rcD, and wD*rdD, respectively.

For each sub-query, the weight-ranking products that include the rankings of the sub-query are added together to yield a sub-query sum, which is then divided by the number of representations to yield the numeric likelihood that evaluation of the sub-query will yield the correct answer for the query in this implementation. In the example, the sub-query a has sum equal to wA*raA plus wB*raB plus wC*raC plus wD*raD, which is divided by the number of representations, or four, to yield the numeric likelihood for the sub-query a. The sub-query b has a numeric likelihood equal to the sum of wA*rbA, wB*rbB, wC*rbC, and wD*rbD, divided by four. The sub-query c has a numeric likelihood equal to the sum of wA*rcA, wB*rcB, wC*rcC, and wD*rcD, divided by four. The sub-query d has a numeric likelihood equal to the sum of wA*rdA, wB*rdB, wC*rdC, and wD*rdD, divided by four.

The computing device evaluates each sub-query to retrieve the representation of the data item to which the sub-query corresponds (504). For instance, the computing device may enter the data graph 100 of FIG. 1 from an entry point, and traverse the graph 100, as the sub-query may dictate, until the node or edge that may have this representation has been reached. Once the computing device reaches the node or edge in question, the device determines whether the information sought is present. If the information is present, then this representation of the data item is retrieved.

As a concrete example, the data graph 100 may be entered for traversal purposes at the node 106. The sub-query being evaluated may correspond to the data representation regarding when the doctor that delivered the person of the node 106 was first called to the delivery room, which would be stored in the edge 124. That is, the sub-query corresponds to the data representation of the birth date of the edge 124. The sub-query may include the path from the node 106 to the edge 124, such as the path including the edge 118 and the node 108. Therefore, the evaluation process includes traversing the data graph 100 from the node 106 to the edge 124 along the prescribed path.

The sub-query, however, may not include this path, and may just specify the edge 124 in question. Therefore, the evaluation process may include traversing outward from all edges 114, 116, and 118 of the person 106, or from selected edges that are more likely to quickly reach the edge 124, until the edge 124 has been reached. This latter evaluation process is likely more processing and time intensive than one that is particularly prescribed in the sub-query itself, but can be advantageous if an exact prescription of the traversal route cannot be determined or is unavailable a priori for inclusion within the sub-query.

The sub-queries as a whole after they have been evaluated return a set of unique representations of the data item that in number is no greater than the number of sub-queries. If each sub-query returns a different value, then the number of unique representations is equal to the number of sub-queries. However, this is not necessarily the case.

Consider the example described above in relation to FIG. 1 as to a person's date of birth. The node 102 and the edges 114 and 124 each store Dec. 31, 1964 as the date of birth of the person of the node 106. The nodes 104, 106, and 108 store Jan. 1, 1965 as the date of birth of the person of the node 106. The edge 116 stores Jan. 2, 1965 as the date of birth of this person. The edge 126 stores Dec. 30, 1964 as the date of birth. In this case, there are eight representations of the date of birth of the person of the node 106, stored in the nodes 102, 104, 106, and 108, and on the edges 114, 116, 124, and 126. However, there are four different values of these representations: Dec. 30, 1964; Dec. 31, 1964; Jan. 1, 1965; and Jan. 2, 1965. As such, there are just four unique representations of the eight representations of the date of birth of the person of the node 106.

For each unique representation that has been retrieved responsive to evaluating the sub-queries, the computing device adds to a likelihood total for the unique representation the numeric likelihood of each sub-query that returned this unique representation (508). Consider the example of the previous paragraph. For the unique representation Dec. 30, 1964, the numeric likelihood of the sub-query corresponding to the representation stored on the edge 126 is the likelihood total for this representation, because just this sub-query returned Dec. 30, 1964. For the unique representation Dec. 31, 1964, the likelihood total is equal to the sum of the numeric likelihoods of the sub-queries corresponding to the representations stored in the node 102 and on the edges 114 and 124, because these sub-queries returned Dec. 31, 1964. For the unique representation Jan. 1, 1965, the likelihood total is equal to the sum of the numeric likelihoods of the sub-queries corresponding to the representations stored in the nodes 104, 106, and 108, because these sub-queries returned Jan. 1, 1965. For the unique representation Jan. 2, 1965, the numeric likelihood of the sub-query corresponding to the representation stored on the edge 116 is the likelihood total for this representation, because just this sub-query returned Jan. 2, 1965.

The computing device may compare the likelihood total of the unique representation having the highest likelihood total to a threshold. If the likelihood total of the unique representation having the highest likelihood total is greater than the threshold (510), then the computing device selects this unique representation as the appropriate representation of the data item for the query (512). If the likelihood total of the unique representation having the highest likelihood total is not greater than the threshold (510) (e.g., if it is less than the threshold), then the computing device reports that the query cannot be successfully evaluated against the data graph (514). For instance, the computing device may return to the client computing device from which the query was received that the information requested is unavailable or unknown.

However, in another implementation, the computing device may not compare the likelihood total of the unique representation having the highest likelihood total to a threshold. In this case, the method 500 can proceed directly from part 508 to part 512. As such, the unique representation having the highest likelihood total is always selected as the appropriate representation of the data item for the query.

Figure 6:
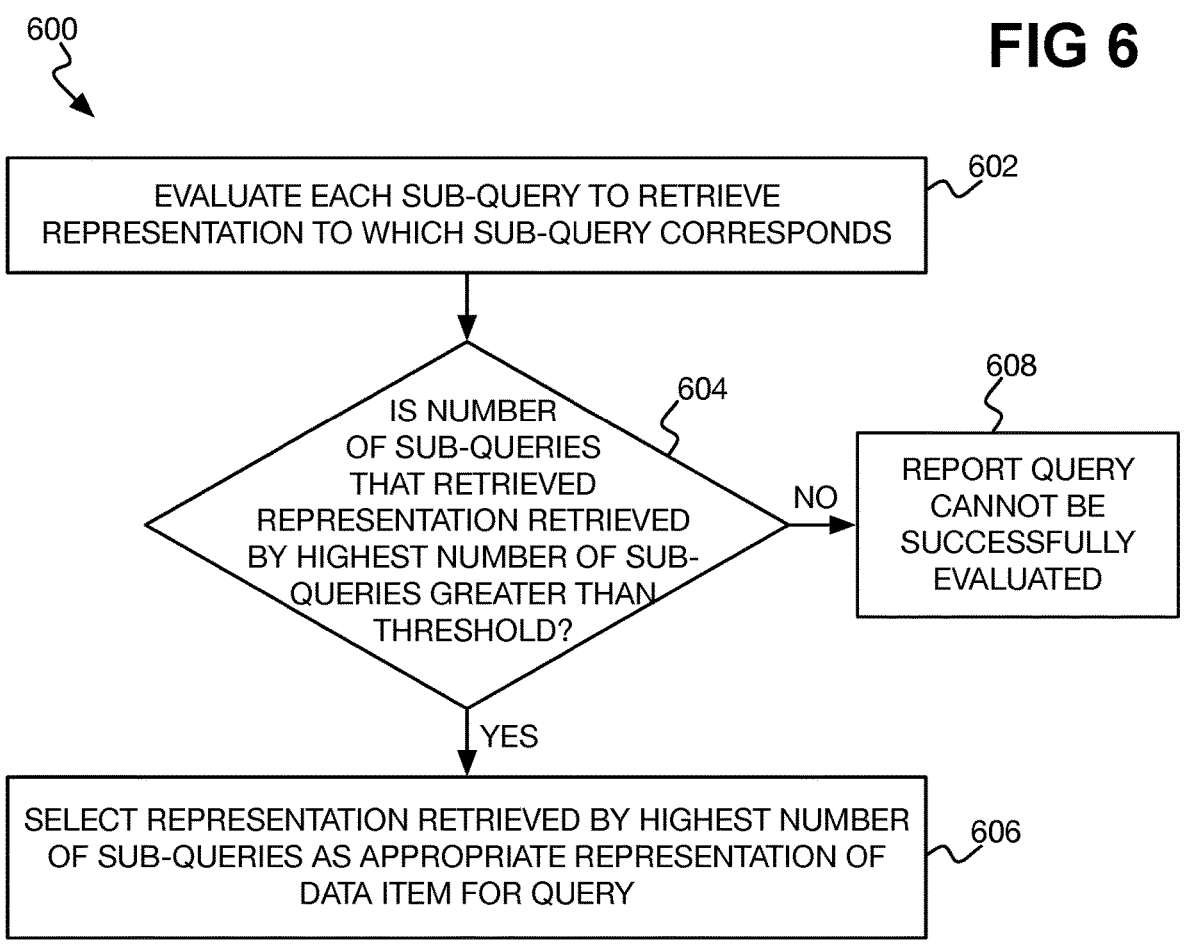

FIG. 6 shows an example method 600 that provides another approach for evaluating the sub-queries to determine the appropriate representation of the data item for the query. Like the method 500, the method 600 can implement part 206 of the method 200. Therefore, the computing device that performs the method 200 can perform the method 600.

The computing device evaluates each sub-query of the query to retrieve the representation of the data item to which the sub-query corresponds (602), as described above in relation to part 504 of the method 500. Evaluation of more than one sub-query may each return the same representation. For instance, there may be four representations A, B, C, and D, such that there are four corresponding sub-queries a, b, c, and d. Representations A and B may both be equal to v1, whereas representation C may be equal to v2, and representation D may be equal to v3. Therefore, the evaluation of two sub-queries, a and b, returned v1, whereas the evaluation of just one sub-query returned each of v2 and v3 (the sub-queries c and d, respectively).

The computing device may compare the number of sub-queries that resulted in retrieval of the same representation the greatest number of times to a threshold. If this number of sub-queries is greater than the threshold (604), then the computing device selects the representation to which each of these sub-queries corresponds as the appropriate representation of the data item for the query (606). If the number of sub-queries in question is no greater than the threshold (604) (e.g., if it is less than the threshold), then the computing device reports that the query cannot be successfully evaluated against the data graph (608).

In another implementation, the computing device may not compare the number of sub-queries that resulted in retrieval of the same representation the greatest number of times to a threshold. In this case, the method 600 can proceed directly from part 602 to part 606. As such, the representation returned by evaluation of the highest number of sub-queries is always selected as the appropriate representation of the data item for the query.

The method 600 presumes that there are not multiple representations that have each been returned by the same highest number of sub-queries. For instance, if there are representations A, B, C, D having corresponding sub-queries a, b, c, and d, if both representations A and B are equal to v1 and both representations C and D are equal to v2, then two sub-queries returned v1 and two sub-queries returned v2. In this case, the computing device may randomly select one of the representations (either v1 or v2) to return as the appropriate representation of the data item for the query, or the computing device may return both representations (both v1 and v2) as equally appropriate for the query.

Figure 7:
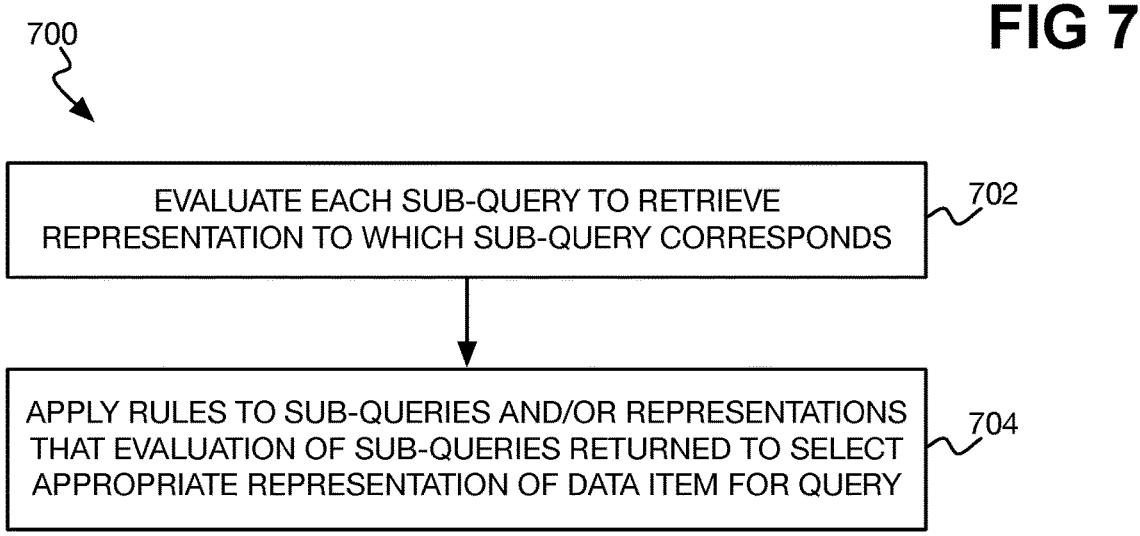

FIG. 7 shows an example method 700 that provides a third approach for evaluating the sub-queries to determine the appropriate representation of the data item for the query. The method 700, like the methods 500 and 600, can implement part 206 of the method 200. As such, the computing device performing the method 200 can perform the method 700.

The computing device evaluates each sub-query to retrieve the representation to which the sub-query corresponds (702), as described above in relation to part 504 of the method 500. The computing device applies rules to the sub-queries and/or the to representations that their evaluations have retrieved to select the appropriate representation of the data item for the query (704).

As an example, the sub-queries may be ordered by the numeric likelihoods that their evaluation will yield the correct answer for the query. The numeric likelihoods may be determined as described in relation to part 502 of the method 500. The representation returned by the sub-query having the highest likelihood may be selected as the appropriate representation just if a threshold total number of the sub-queries have returned the same representation. If this is not the case, but the representation returned by the sub-query having the second highest likelihood was returned by the threshold total number of sub-queries, then this representation may instead be selected. However, if this is also not the case, then the representation returned by the sub-query having the highest likelihood is still selected.

The rules can thus be expressed in IF-THEN-ELSE form. In the example of the previous paragraph, the sub-query having the highest likelihood that evaluation thereof will yield the correct answer for the query may be sub-query sq1, and the sub-query having the next-highest likelihood that evaluation thereof will yield the correct answer for the query may be sub-query sq2. The other sub-queries may be sq3 . . . sqN. The sub-query q1 may have returned the representation v1, and the sub-query q2 may have returned the representation v2. The threshold may be expressed as T. Therefore, the rule of the previous paragraph is IF num(sq1 . . . sqN) that returned v1 is >=T THEN appropriate representation is v1, ELSE IF num(sq2 . . . sqN) that returned v2 is >=T THEN appropriate representation is v2, ELSE appropriate representation is v1.

The approaches for evaluating the sub-queries of a query of the methods 500, 600, and 700 that have been described evaluate every sub-query of the query to select the appropriate representation of the data item in satisfaction of the query. In FIG. 5, the appropriate representation of the data item can be selected in consideration of the numeric likelihoods that evaluation of the sub-queries will yield the correct answer for the query. In FIG. 6, the appropriate representation of the data item can be selected as that which is returned by evaluating the greatest number of the sub-queries. In FIG. 7, the appropriate representation of the data item can be selected by applying rules to the sub-queries and the representations that their evaluations have retrieved. However, in other approaches, not all the sub-queries of a query have to be evaluated.

Figure 8:
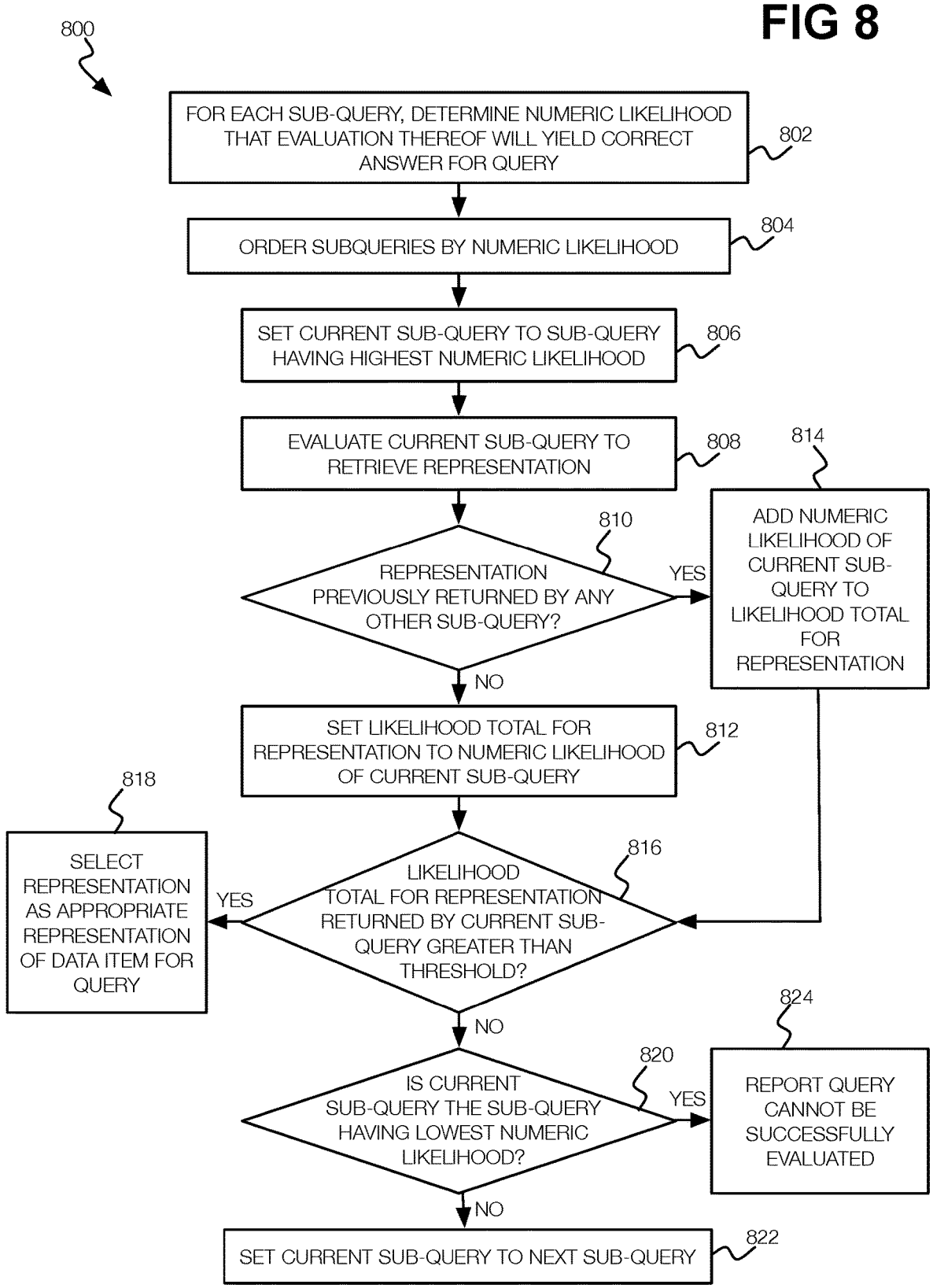
FIG. 8 is a flowchart of an example method for evaluating at least some sub-queries of a query, which can be used as part of the method 200.

FIG. 8 shows such an example method 800 that provides a fourth approach for evaluating one or more of the sub-queries to determine the appropriate representation of the data item for the query. The method 800, like the methods 500, 600, and 700, can implement part 206 of the method 200. Therefore, the computing device performing the method 200 can perform the method 800.

For each sub-query of the query, the computing device determines the numeric likelihood that evaluation of the sub-query will yield the correct answer for the query (802). Part 802 can be performed as described above in relation to part 502 of the method 500. The computing device then orders the sub-queries by their numeric likelihoods (804), from highest likelihood to lowest likelihood. For instance, the sub-queries can be ordered in a list by their numeric likelihoods in this manner.

The computing device sets what is referred to as a current sub-query to the sub-query having the highest numeric likelihood (806), and evaluates the current sub-query to retrieve the representation of the data item to which the current sub-query corresponds (808). If this representation was not previously returned by any other sub-query (810), then the computing device sets what is referred to as a likelihood total for the representation to the numeric likelihood of the current sub-query (812). However, if this representation was previously returned by another sub-query (810), then the numeric likelihood of the current sub-query is added to the likelihood total for the representation (814).

From both parts 812 and 814, in performing the method 800 the computing device proceeds to determine whether the likelihood total for the representation returned by the current sub-query is greater than a threshold. If the likelihood total for the representation returned by the current sub-query is greater than the threshold (816), then the computing selects this representation as the appropriate representation of the data item for the query (818). Otherwise, if the current sub-query is not the sub-query having the lowest numeric likelihood (820), then the computing device sets the current sub-query to the next sub-query within the ordered list of sub-queries (822)—which is the sub-query having the next lower numeric likelihood as compared to the current sub-query—and repeats the method 800 at part 808.

However, if the current sub-query is the sub-query having the lowest numeric likelihood (820), then the computing device reports that the query cannot be successfully evaluated against the data graph (824). Part 824 of the method 800 is reached after all the sub-queries have been evaluated, and none of the representations have a likelihood total greater than the threshold. As such, none of the representations can be selected with a confidence level corresponding to the threshold as the appropriate representation of the data item the query.

In effect, in the method 800, each representation returned by any sub-query has a corresponding total of the numeric likelihoods of the sub-queries that returned this representation. In this sense, the likelihood total of a representation in the method 800 is like that of the method 500. The difference between the likelihood total of the method 800 and the likelihood total of the method 500 is that in the method 500, all the sub-queries are run, the likelihood totals for the representations determined, and the representation having the greatest likelihood total may be selected as the appropriate representation of the data item for the query. By comparison, in the method 800, after each sub-query is evaluated, the likelihood total for the representation returned by the most recently evaluated is updated. If the likelihood total for this representation is greater than a threshold, then it is selected as the appropriate representation for the query. Any other queries that have not yet been evaluated remain unevaluated.

Figure 9:
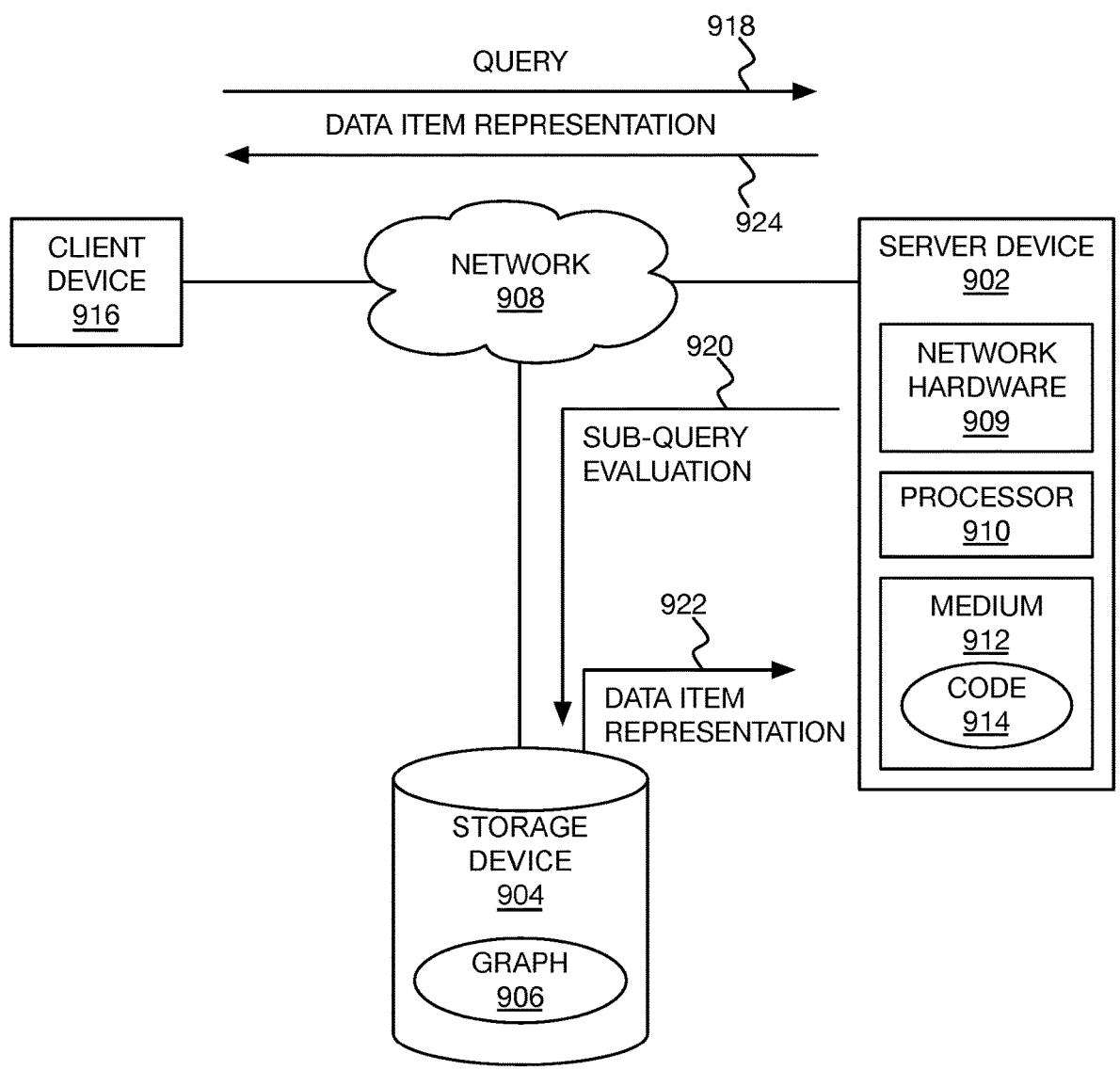
FIG. 9 is a diagram of an example system.

FIG. 9 shows an example system 900. The system 900 can include a server computing device 902 and a storage device 904 that stores a data graph 906, such as the data graph 100 that has been described. As depicted in the example of FIG. 9, the server computing device 902 and the storage device 904 are communicatively connected to on another over a network 908. However, in another implementation, the storage device 904 may be part of or directly connected to the server computing device 902.

The server computing device 902 includes network hardware 909, a processor 910, and a computer-readable medium 912 that stores computer-executable code 914. The network hardware 909 can include an Ethernet adapter, or another type of network adapter. The network hardware 909 permits the server computing device 902 to communicatively connect to the network 908, to which the storage device 904 is also communicatively connected in the example of FIG. 9. The computer-readable medium 912 may be or include a volatile or non-volatile medium. The processor 910 executes the code 914 from the medium to perform any of the methods that have been described.

The storage device 904 can be or include a non-volatile storage device, and may be part of a SAN or another type of storage system or sub-system. The network 908 may be or include a local-area network (LAN), a wide-area network (WAN), an intranet, an extranet, the Internet, as well as other types of networks. A client computing device 916 can also be communicatively connected to the network 908. The client computing device 916 may be a general-purpose computer, such as a desktop or laptop computer, and/or a mobile computing device, such as a smartphone, a tablet computing device, and so on.

In operation, the server computing device 902 receives a query for a data item of the data graph 906 from the client computing device 916, per arrow 918. The server computing device 902 responsively determines sub-queries for this query, and evaluates one or more sub-queries against the data graph 906 of the storage device 904, per arrow 920. In response, the server computing device 902 can receive a representation of the data item appropriate to the query, per arrow 922. The server computing device 902 then returns this representation of the data item to the client computing device 916, per arrow 924. The data and processing flow represented by the arrows 918, 920, 922, and 924 thus represent the data and processing that flows and occurs among the devices 902, 904, and 906 over the network 908 in realizing the method 200 of FIG. 2.

The techniques that have been described herein provide for a manner by which a query for a data item that has multiple representations in a data graph to be evaluated. In some of the approaches described herein, all sub-queries for a query are evaluated, in an attempt to ensure that the best possible representation of the data item is selected as the answer for the query. Even in approaches in which all the sub-queries are not evaluated, the first sub-query evaluated does not necessarily result in the selection of the representation of the data item that is returned for the query. Rather, a number of sub-queries may be evaluated until a confidence is gained that a given representation is the appropriate representation of the data item for the query.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

I claim:

1. A method comprising:
    receiving, by a computing device, a query for retrieving a data item of a data graph, the data graph storing a plurality of representations of the data item, each representation of the data item storing knowledge represented by the data item in a different manner;
    determining, by the computing device, a plurality of sub-queries for the query, each sub-query of the plurality of sub-queries corresponding to a different representation by which the data graph stores the data item, each sub-query of the plurality of sub-queries has a numeric likelihood that an evaluation of each of the plurality of sub-queries will yield a correct answer for the query, wherein the numeric likelihood for each sub-query is a result of a sum of weight-ranking products for the sub-query being divided by a number of representations of the data item, the numeric likelihood is determined each time a new data item is added to the data graph, wherein each sub-query of the plurality of sub-queries is modified from a general sub-query, wherein each general sub-query corresponds to each new representation of the data item and is determined for the new representation of the data item each time the new representation of the data item is added to the data graph, the general sub-query identifies a type of node or edge in which a corresponding representation of the data item is located and traversal information of how to reach the type of node or edge; and
    evaluating, by the computing device, one or more of the sub-queries to determine an appropriate representation of the data item in satisfaction of the query.

2. The method of claim 1, further comprising:
    returning, by the computing device, the appropriate representation of the item to fulfill the query.

3. The method of claim 1, wherein evaluating the one or more of the sub-queries comprises:
    evaluating each sub-query to retrieve the representation of the data item to which the sub-query corresponds;
    determining one or more unique representations of the representations of the data item retrieved by evaluating the sub-queries;
    for each unique representation, adding to a likelihood total for the unique representation the numeric likelihood of each sub-query that evaluation of which returned the unique representation; and
    selecting the unique representation having a highest likelihood total as the appropriate representation of the data item for the query.

4. The method of claim 1, wherein evaluating the one or more of the sub-queries comprises:
- determining, for each sub-query, a numeric likelihood that evaluation of the sub-query will yield a correct answer for the query;
- evaluating each sub-query to retrieve the representation of the data item to which the sub-query corresponds;
- determining one or more unique representations of the representations of the data item retrieved by evaluating the sub-queries;
- for each unique representation, adding to a likelihood total for the unique representation the numeric likelihood of each sub-query that evaluation of which returned the unique representation;
- if the likelihood total of the unique representation having a highest likelihood total is greater than a threshold, selecting the unique representation having the highest likelihood total as the appropriate representation of the data item for the query; and
- if the likelihood total of the unique representation having the highest likelihood total is less than the threshold, reporting that the query cannot be successfully evaluated against the data graph.

5. The method of claim 1, wherein evaluating the one or more of the sub-queries comprises:
- evaluating each sub-query to retrieve the representation of the data item to which the sub-query corresponds; and
- selecting the representation retrieved by a highest number of the sub-queries as the appropriate representation of the data item for the query.

6. The method of claim 1, wherein evaluating the one or more of the sub-queries comprises:
- evaluating each sub-query to retrieve the representation of the data item to which the sub-query corresponds; and
- determining the representation retrieved by a highest number of the sub-queries;
- if the highest number of the sub-queries that retrieved the determined representation is greater than a threshold, selecting the determined representation as the appropriate representation of the data item for the query; and
- if the highest number of the sub-queries that retrieved the determined representation is less than the threshold, reporting that the query cannot be successfully evaluated against the data graph.

7. The method of claim 1, wherein evaluating the one or more of the sub-queries comprises:
- for each sub-query, determining a numeric likelihood that evaluation of the sub-query will yield a correct answer for the query;
- setting a current sub-query to a first sub-query of the sub-queries;
- evaluating the current sub-query to retrieve the representation of the data item to which the sub-query corresponds;
- if any previously evaluated sub-query resulted in retrieval of a same representation as the representation to which the sub-query corresponds, adding the numeric likelihood to a likelihood total for the representation;
- if no other previously evaluated sub-query resulted in the retrieval of the same representation as the representation to which the sub-query corresponds, setting the likelihood total for the representation to the numeric likelihood;
- if the likelihood total for the representation is greater than a threshold, selecting the representation as the appropriate representation of the data query for the item;
- if the likelihood total for the representation is less than the threshold and if another sub-query has not yet been evaluated, setting the current sub-query to a next sub-query of the sub-queries and again evaluating the current sub-query; and
- if the likelihood total for the representation is less than the threshold and if no other sub-query has not yet been evaluated, reporting that the query cannot be successfully evaluated against the data graph.

8. The method of claim 7, wherein evaluating the one or more of the sub-queries further comprises:
- prior to setting the current sub-query to the first sub-query, ordering the sub-queries according to likelihoods that evaluation thereof will yield the appropriate representation of the data item for the query.

9. The method of claim 1, wherein evaluating the one or more of the sub-queries comprises:
- evaluating each sub-query to retrieve the representation of the data item to which the sub-query corresponds; and
- applying a plurality of rules to the sub-queries and the representations that the evaluation of the sub-queries returned to select the appropriate representation of the data item for the query.

10. A computer program product comprising a computer-readable storage medium having program instructions embodied therewith, wherein the computer-readable storage medium is not a transitory signal per se, the program instructions executed by a computing device to:
- determine a plurality of sub-queries for a query, the query for retrieving a data item of a data graph, the data graph storing a plurality of representations of the data item, each representation of the data item storing knowledge represented by the data item in a different way, each sub-query of the plurality of sub-queries corresponding to a different representation by which the data graph stores the data item, each sub-query of the plurality of sub-queries has a numeric likelihood that an evaluation of each of the plurality of sub-queries will yield a correct answer to the query, wherein the numeric likelihood for each sub-query is a result of a sum of weight-ranking products for the sub-query being divided by a number of representations of the data item, the numeric likelihood is determined each time a new data item is added to the data graph, the numeric likelihood is determined each time a new data item is added to the data graph, wherein each sub-query of the plurality of sub-queries is modified from a general sub-query, wherein each general sub-query corresponds to each new representation of the data item and is determined for the new representation of the data item each time the new representation of the data item is added to the data graph, the general sub-query identifies a type of node or edge in which a corresponding representation of the data item is located and traversal information of how to reach the type of node or edge; and
- evaluate one or more of the sub-queries to determine an appropriate representation of the data item in fulfillment of the query.

11. The computer program product of claim 10, wherein the computing device is to evaluate the one or more of the sub-queries by:
- evaluating each sub-query to retrieve the representation of the data item to which the sub-query corresponds;
- determining one or more unique representations of the representations of the data item retrieved by evaluating the sub-queries;

for each unique representation, adding to a weight for the unique representation the numeric likelihood of each sub-query that evaluation of which returned the unique representation; and selecting the unique representation having a highest weight as the appropriate representation of the data item for the query.

12. The computer program product of claim 10, wherein the computing device is to evaluate the one or more of the sub-queries by:

evaluating each sub-query to retrieve the representation of the data item to which the sub-query corresponds; and selecting the representation retrieved by a highest number of the sub-queries as the appropriate representation of the data item for the query.

13. The computer program product of claim 10, wherein the computing device is to evaluate the one or more of the sub-queries by:

setting a current sub-query to a first sub-query of the sub-queries;

determining a numeric likelihood that evaluation of the current sub-query will yield a correct answer for the query;

evaluating the current sub-query to retrieve the representation of the data item to which the sub-query corresponds;

if any previously evaluated sub-query resulted in retrieval of a same representation as the representation to which the sub-query corresponds, adding the numeric likelihood to a likelihood total for the representation;

if no other previously evaluated sub-query resulted in the retrieval of the same representation as the representation to which the sub-query corresponds, setting the likelihood total for the representation to the numeric likelihood;

if the likelihood total for the representation is greater than a threshold, selecting the representation as the appropriate representation of the data query for the item;

if the likelihood total for the representation is less than the threshold and if another sub-query has not yet been evaluated, setting the current sub-query to a next sub-query of the sub-queries and again evaluating the current sub-query; and if the likelihood total for the representation is less than the threshold and if no other sub-query has not yet been evaluated, reporting that the query cannot be successfully evaluated against the data graph.

14. The computer program product of claim 13, wherein the computing device is to evaluate the one or more of the sub-queries by further:

prior to setting the current sub-query to the first sub-query, ordering the sub-queries according to likelihoods that evaluation thereof will yield the appropriate representation of the data item for the query.

15. The computer program product of claim 10, wherein the computing device is to evaluate the one or more of the sub-queries by:

evaluating each sub-query to retrieve the representation of the data item to which the sub-query corresponds; and applying a plurality of rules to the sub-queries and the representations that the evaluation of the sub-queries returned to select the appropriate representation of the data item for the query.

16. A system comprising:

network hardware to communicatively connect to a network over which a query for retrieving a data item of a data graph is received;

a storage device to store the data graph, the data graph including a plurality of representations of the data item, each representation representing the data item in a different way, and logic comprising hardware, to:

select an appropriate representation of the data item in satisfaction of the query by evaluating a plurality of sub-queries for the query, each sub-query of the plurality of sub-queries corresponding to a different representation by which the data graph stores the data item, each sub-query of the plurality of sub-queries has a numeric likelihood that an evaluation of each of the plurality of sub-queries will yield a correct answer for the query, wherein the numeric likelihood for each sub-query is a result of a sum of weight-ranking products for the sub-query being divided by a number of representations of the data item, the numeric likelihood is determined each time a new data item is added to the data graph, the numeric likelihood is determined each time a new data item is added to the data graph, wherein each sub-query of the plurality of sub-queries is modified from a general sub-query, wherein each general sub-query corresponds to each new representation of the data item and is determined for the new representation of the data item each time the new representation of the data item is added to the data graph, the general sub-query identifies a type of node or edge in which a corresponding representation of the data item is located and traversal information of how to reach the type of node or edge.

17. The system of claim 16, wherein the logic is to evaluate the sub-queries for the query by:

evaluating each sub-query to retrieve the representation of the data item to which the sub-query corresponds;

determining one or more unique representations of the representations of the data item retrieved by evaluating the sub-queries;

for each unique representation, adding to a weight for the unique representation the numeric likelihood of each sub-query that evaluation of which returned the unique representation; and selecting the unique representation having a highest weight as the appropriate representation of the data item for the query.

18. The system of claim 16, wherein the logic is to evaluate the sub-queries for the query by:

evaluating each sub-query to retrieve the representation of the data item to which the sub-query corresponds; and selecting the representation retrieved by a highest number of the sub-queries as the appropriate representation of the data item for the query.

19. The system of claim 16, wherein the logic is to evaluate the sub-queries for the query by:

setting a current sub-query to a first sub-query of the sub-queries;

determining a numeric likelihood that evaluation of the current sub-query will yield a correct answer for the query;

evaluating the current sub-query to retrieve the representation of the data item to which the sub-query corresponds;

if any previously evaluated sub-query resulted in retrieval of a same representation as the representation to which the sub-query corresponds, adding the numeric likelihood to a likelihood total for the representation;

if no other previously evaluated sub-query resulted in the retrieval of the same representation as the representation to which the sub-query corresponds, setting the likelihood total for the representation to the numeric likelihood;

if the likelihood total for the representation is greater than a threshold, selecting the representation as the appropriate representation of the data query for the item;

if the likelihood total for the representation is less than the threshold and if another sub-query has not yet been evaluated, setting the current sub-query to a next sub-query of the sub-queries and again evaluating the current sub-query; and if the likelihood total for the representation is less than the threshold and if no other sub-query has not yet been evaluated, reporting that the query cannot be successfully evaluated against the data graph.

20. The system of claim 16, wherein the logic is to evaluate the sub-queries for the query by:

evaluating each sub-query to retrieve the representation of the data item to which the sub-query corresponds; and applying a plurality of rules to the sub-queries and the representations that the evaluation of the sub-queries returned to select the appropriate representation of the data item for the query.

* * * * *